(12) United States Patent
Bowers

(10) Patent No.: US 11,959,274 B2
(45) Date of Patent: Apr. 16, 2024

(54) INTERLOCKING BUILDING BLOCKS AND MORTARLESS INTERLOCKING BUILDING SYSTEM

(71) Applicant: Dustin Bowers, Hampstead (CA)

(72) Inventor: Dustin Bowers, Hampstead (CA)

(73) Assignee: PLAEX BUILDING SYSTEMS INC., New Brunswick (CA)

( * ) Notice: Subject to any disclaimer, the term of this patent is extended or adjusted under 35 U.S.C. 154(b) by 0 days.

(21) Appl. No.: 18/099,593

(22) Filed: Jan. 20, 2023

(65) Prior Publication Data

US 2023/0160199 A1    May 25, 2023

Related U.S. Application Data

(63) Continuation of application No. 17/133,959, filed on Dec. 24, 2020, now abandoned.

(30) Foreign Application Priority Data

Aug. 31, 2020    (CA) .................................. CA 3091815

(51) Int. Cl.
| | |
|---|---|
| *E04B 2/18* | (2006.01) |
| *E04B 2/02* | (2006.01) |
| *E04B 2/26* | (2006.01) |
| *E04C 1/39* | (2006.01) |

(52) U.S. Cl.
CPC .................. *E04B 2/18* (2013.01); *E04B 2/26* (2013.01); *E04C 1/397* (2013.01); *E04B 2002/0223* (2013.01); *E04B 2002/0236* (2013.01)

(58) Field of Classification Search
CPC ...... E04B 2/18; E04B 2/26; E04B 2002/0223; E04B 2002/0236; E04C 1/397; E04C 1/00; A63H 33/08
See application file for complete search history.

(56) References Cited

U.S. PATENT DOCUMENTS

| | | | | | |
|---|---|---|---|---|---|
| 2,205,730 | A | * | 6/1940 | Morgan ................... | E04B 2/18 |
| | | | | | 52/439 |
| 3,391,507 | A | * | 7/1968 | Downing ................. | E04C 1/40 |
| | | | | | 52/606 |
| 3,668,832 | A | * | 6/1972 | Harman .................... | E04B 2/18 |
| | | | | | 52/591.2 |
| 5,098,328 | A | * | 3/1992 | Beerens ............... | A63H 33/086 |
| | | | | | 446/128 |

(Continued)

FOREIGN PATENT DOCUMENTS

| | | | |
|---|---|---|---|
| CN | 2213770 | Y * | 11/1995 |
| CN | 201040891 | Y * | 3/2008 |

(Continued)

OTHER PUBLICATIONS

International Search Report and Written Opinion for PCT/CA2021/051200 (10 pages). (Year: 2021).*

*Primary Examiner* — Rodney Mintz
(74) *Attorney, Agent, or Firm* — Eugene F. Derenyi

(57) ABSTRACT

A building system including at least one block and further including at least one mortarless side panel including a finished outside surface and at least one dovetail protrusion on an opposing surface for joining the side panel to the at least one blocks, and a connector on each end of the panel for joining the side panel to other side panels, and at least one top cap including a finished top surface.

13 Claims, 13 Drawing Sheets

(56) References Cited

U.S. PATENT DOCUMENTS

| | | | | |
|---|---|---|---|---|
| 5,687,530 | A * | 11/1997 | Van der Heijden | E04C 1/40 52/561 |
| 6,571,525 | B2 * | 6/2003 | Coleman | E04B 2/08 52/592.1 |
| 7,345,107 | B2 * | 3/2008 | Manes | C04B 26/006 524/493 |
| 7,694,485 | B1 * | 4/2010 | Siener | E04B 2/18 52/592.6 |
| 7,704,011 | B2 * | 4/2010 | Marshall | E03F 1/005 404/34 |
| 9,453,341 | B1 * | 9/2016 | Swierad | E01F 8/0005 |
| 9,808,734 | B2 * | 11/2017 | Kuo | E04B 2/22 |
| 9,951,490 | B2 * | 4/2018 | Scherkl | E04C 1/00 |
| 10,183,228 | B2 * | 1/2019 | Kuo | E04C 1/00 |
| 10,787,810 | B2 * | 9/2020 | Bergollo | E04B 2/18 |
| 2003/0029119 | A1 * | 2/2003 | Coleman | E04B 2/08 52/592.6 |
| 2004/0130065 | A1 * | 7/2004 | Manes | C04B 40/0085 264/239 |
| 2007/0186499 | A1 * | 8/2007 | Marshall | E03F 1/005 52/295 |
| 2014/0106108 | A1 * | 4/2014 | Lin | E04B 1/02 428/58 |
| 2014/0331590 | A1 * | 11/2014 | Goltsman | E04B 2/26 52/592.5 |
| 2016/0090705 | A1 * | 3/2016 | Scherkl | E02B 3/10 405/116 |
| 2016/0346707 | A1 * | 12/2016 | Kuo | E04B 2/12 |
| 2017/0036134 | A1 * | 2/2017 | Kuo | E04B 2/12 |
| 2018/0028932 | A1 * | 2/2018 | Kuo | E04C 1/00 |
| 2020/0171400 | A1 * | 6/2020 | Felix | A63H 33/082 |
| 2020/0217066 | A1 * | 7/2020 | Bergollo | E04B 2/08 |
| 2021/0238846 | A1 * | 8/2021 | Zhang | E04B 2/08 |
| 2022/0064941 | A1 * | 3/2022 | Bowers | E04B 2/18 |

FOREIGN PATENT DOCUMENTS

| | | |
|---|---|---|
| DE | 2926836 A1 * | 1/1980 |
| IT | BZ20110043 A1 * | 3/2013 |

\* cited by examiner

INTERLOCKING BUILDING BLOCKS AND MORTARLESS INTERLOCKING BUILDING SYSTEM

CROSS-REFERENCE TO RELATED APPLICATIONS

This application is a continuation of U.S. patent application Ser. No. 17/133,959 filed Dec. 24, 2020 which is incorporated herein by reference in its entirety.

FIELD

The present invention relates to building blocks for a mortarless interlocking building system.

BACKGROUND

Compressed earth bricks and fired bricks have been used to construct buildings for thousands of years. One reason is that earth (clay, soil, rock) is a very good insulator/thermal mass against heat and cold. The big drawback for compressed earth bricks, concrete blocks, or even a fired brick is that they absorb water; the water expands when frozen, and over time the bricks crack and fall apart.

The single use nature of traditional building materials creates much unnecessary waste. The volume of construction waste generated worldwide every year will be 2.2. billion tons by the year 2025, of which only 48% is recycled. On average, every year more than 242,000,000 tons of plastic waste is produced. Of that amount, only about 9% is recycled.

A building system which addresses such shortcomings in the art would be desirable.

SUMMARY

In one aspect, the present disclosure address three major issues at once: (i) the building components are made of currently unused and or under-utilized waste plastics and other waste aggregates to create a reusable, fully interlocking building system that drastically reduces the amount of waste created in the building process; (ii). the building components are comparable to and exceed concrete blocks in many metrics including strength, crack resistance, and water absorption; and (iii) the building system is highly versatile and will be able to be used for a wide range of permanent and temporary wall structures such as retaining walls, flood barriers, and foundations. The invention stands out from all other systems due to the fact that it interlocks on all sides allowing for unmatched structural strength and versatility.

In one aspect, the present disclosure relates to an interlocking construction system, also referred to as a building system, including interlocking components made of recycled materials. In one aspect, the interlocking components consist of 90% or greater of recycling materials. In another aspect, the interlocking components are made from a recycled thermal plastic and aggregate composite. In another aspect, the interlocking components include six-sided interlocking bricks, which six sides include interlocking components permitting the interlocking of the brick on all six sides with other interlocking components. In another aspect, adhesives can optionally be used to adhere the bricks to other interlocking bricks or components. Interlocking components may be finished with a click panel exterior. Interlocking bricks according to embodiments of the present invention are stronger than concrete blocks and provide excellent resistance to water, insects, mould/mildew, storms, and high wind. Bricks according to embodiments of the present invention are environmentally friendly, less expensive to build with than wood or concrete, and require little maintenance. Bricks according to embodiments of the present invention can be used for a wide range of applications from retaining walls and flood barriers, to full building systems and more. Building systems according to embodiments of the present invention may also be adapted for autonomous construction.

BRIEF DESCRIPTIONS OF DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
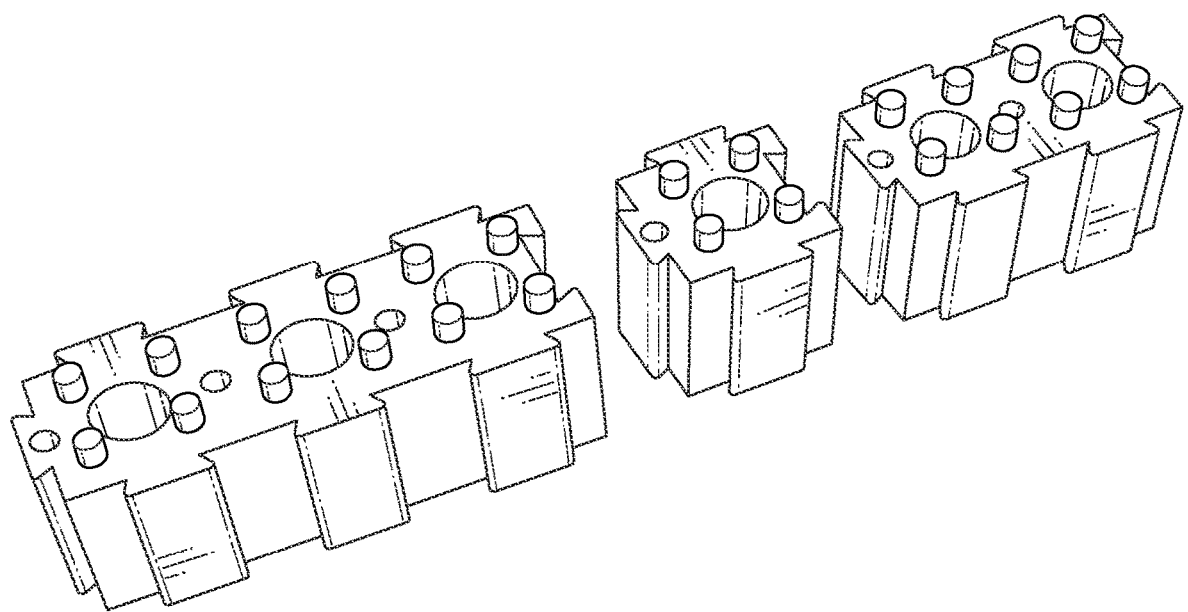
FIG. 1 is a perspective view of three building blocks according to embodiments of the present invention.

With reference to FIG. 1, in one embodiment, the present invention relates to.a six sided interlocking construction block indicated generally at 101 (and corresponding interlocking components) produced from a heat extruded and form pressed mix of 90%+ recycled plastics and recycled aggregates. These blocks and corresponding components can be assembled for any range of applications; from retaining walls and flood barriers to full building wall construction. The blocks conform with typical North American framing standards (16*c* & 24*c*) and meet industry load/shear requirements. The blocks can be connected with interlocking exterior panels on one or both sides and can also be easily framed inside with a traditional stud structure. The blocks can be cut, screwed and drilled with less effort than traditional concrete blocks and without the nuisance of cracks and chips.

Figure 2:
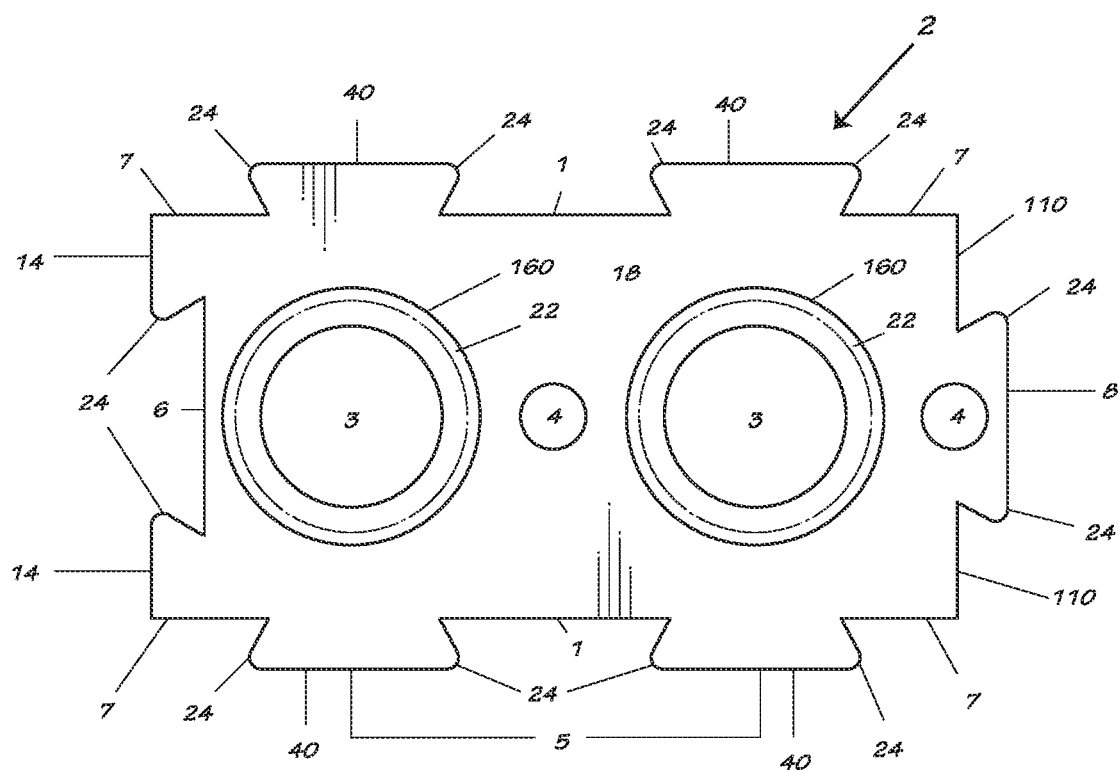
FIG. 2 is a top view of a building block according to another embodiment of the present invention.
Figure 3:
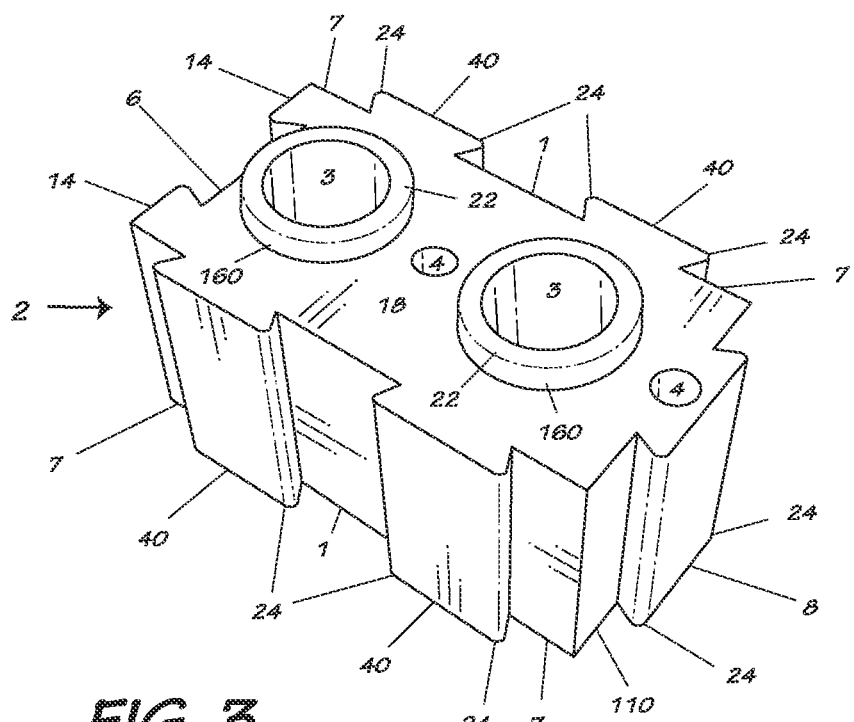
FIG. 3 is a top perspective view of the block of FIG. 2.
Figure 4:
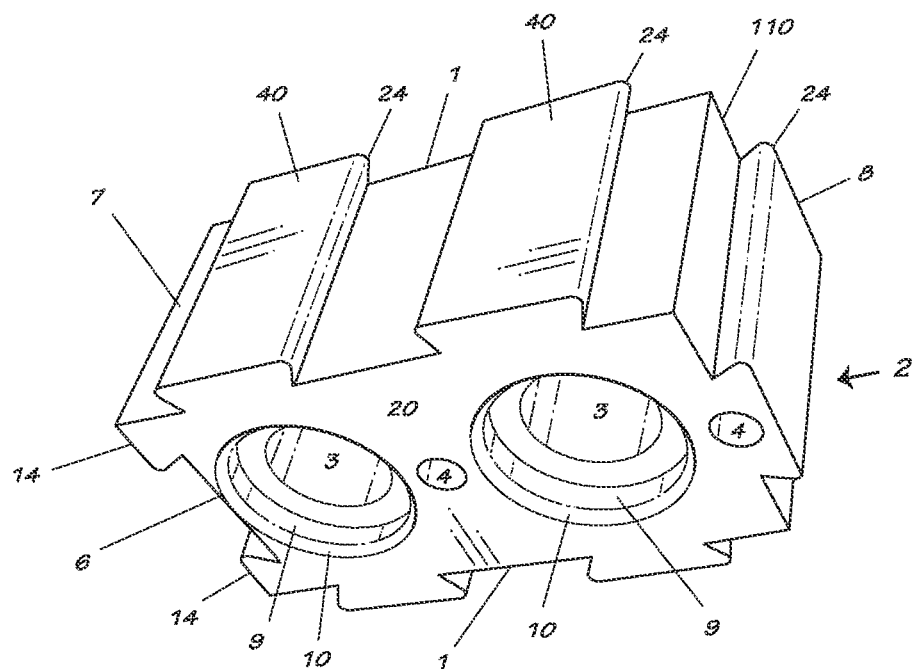
FIG. 4 is a bottom perspective view of the block of FIG. 2.

Referring initially to FIG. 2 to FIG. 4, in another embodiment, the present invention relates to an interlocking building system which includes building blocks that interlock on all six sides of the blocks. In one embodiment, the system includes a rectangular block 2, eight inches in length and sixteen inches in height, but may be of other building dimensions. The block includes dovetail interlock protrusions 40 on side vertical faces 7, a dovetail protrusion 8 on an end face 110, a dovetail recess 6 on end face 14, tubular protrusions 160 on the top face 18 and tubular recesses 9 on the bottom face 20 of the block 2. The tubular protrusions 160 may also be considered male connectors and the tubular recesses 9 may also be considered to be female sockets. The dovetail interlock protrusions 40 define a dovetail a recess 1 there between. The edges 22 of the rims of the tubular protrusions 160 are rounded. The edges 10 of the tubular recesses 9 are chamfered. The centre of the dovetail protrusions 4 are spaced eight inches apart as illustrated by dimension line 5. Other spacings for the dovetail protrusions can be used. The corners 24 of the dovetail protrusions 40 are rounded. A first pair of tubular channels run from the tubular protrusions though the body of the block 2 to the tubular recesses 9. The first pair of tubular channels 3 may accommodate wiring, pipes, or extra reinforcement such as re-bar or poured concrete when the block is installed. A second pair of tubular channels 40, smaller in diameter than the first pair 3, run from the bottom face 20 through the body of the solid block 2 to the top face 18. The second pair of tubular channels 4 may accommodate can accommodate wiring or re-bar reinforcement (not shown). One or more lateral channels may be added to allow for the installation of recycled tire seals or more wiring options.

Figure 5:
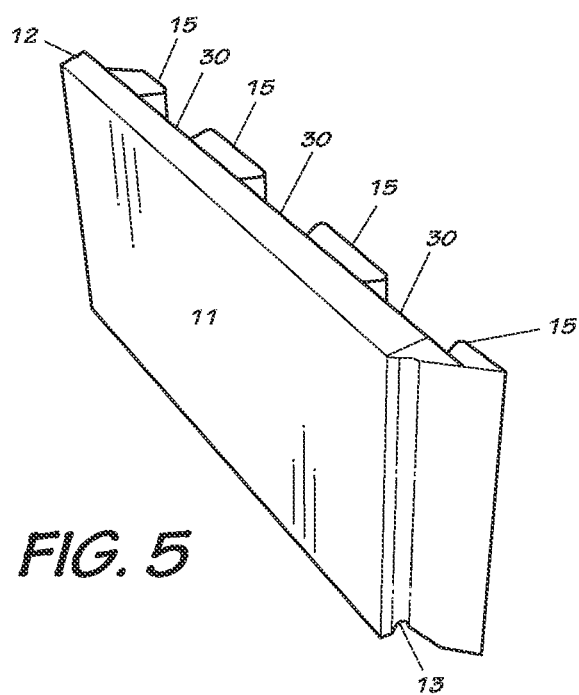
FIG. 5 is a front perspective view of a side click panel according to an embodiment of the present invention.
Figure 6:
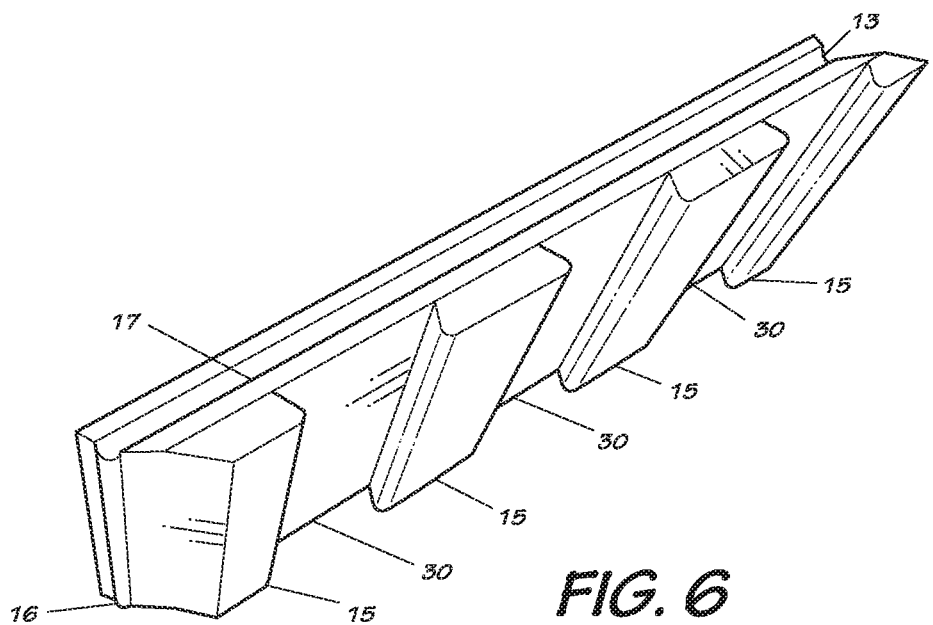
FIG. 6 is a rear perspective view of the side click panel of FIG. 5.

Referring to FIG. 5 and FIG. 6, the system may also include a side panel with a water lock design. The side panel includes an outside finished surface 11, a inclined edge 12 on the top and bottom edges forming a v-lock to lock out water, a notch 13 and protrusion 16 for vertical interlock and also to lock out water, and dovetail protrusions 15 and dovetail recesses 30 on the rectangular inside face. As with the dovetail protrusions 40 of the block 2, the corners of the dovetail protrusions 15 are rounded to facilitate press fitting.

Figure 7:
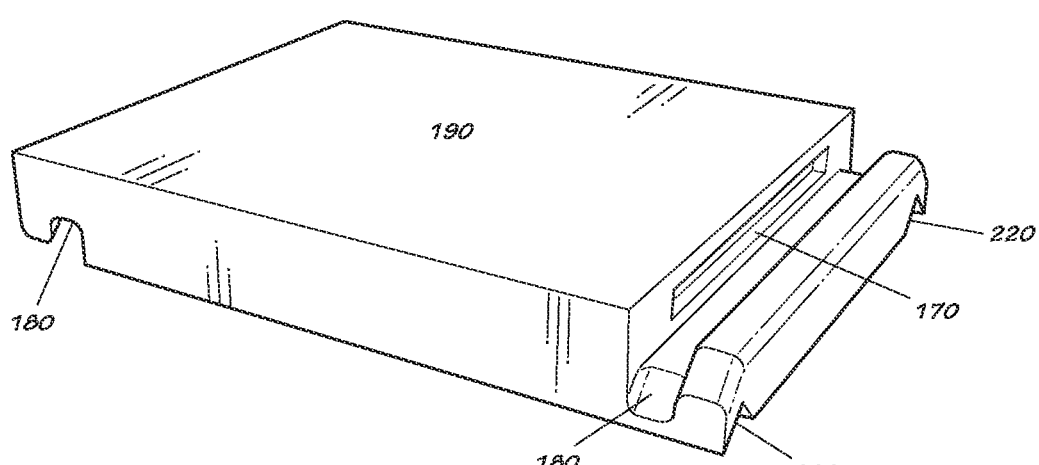
FIG. 7 is a top perspective view of a top cap according to an embodiment of the present invention.
Figure 8:
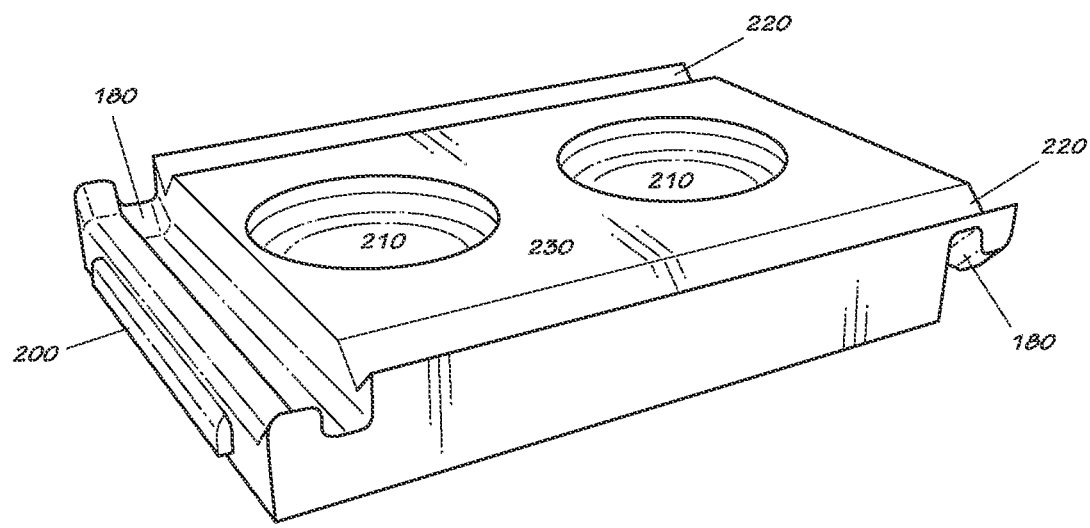
FIG. 8 is a bottom perspective view of the top cap of FIG. 7.

Referring to FIG. 7 and FIG. 8, the system can also include a top cap with a water lock design. The top cap panel includes a finished top surface 190 with a female cap interlock 170 and a tapered interlock 180 for water drainage. The bottom of the top cap includes, male cap interlock, circular recesses 210 with chamfered edges and a v-notch.

The finished surfaces of the side panel and the top cap can be finished with a wide range of finishes including, but not limited to, insulation, stone textures, solar voltaic integration, or any other integration with the corresponding interlocking system.

Figure 9:
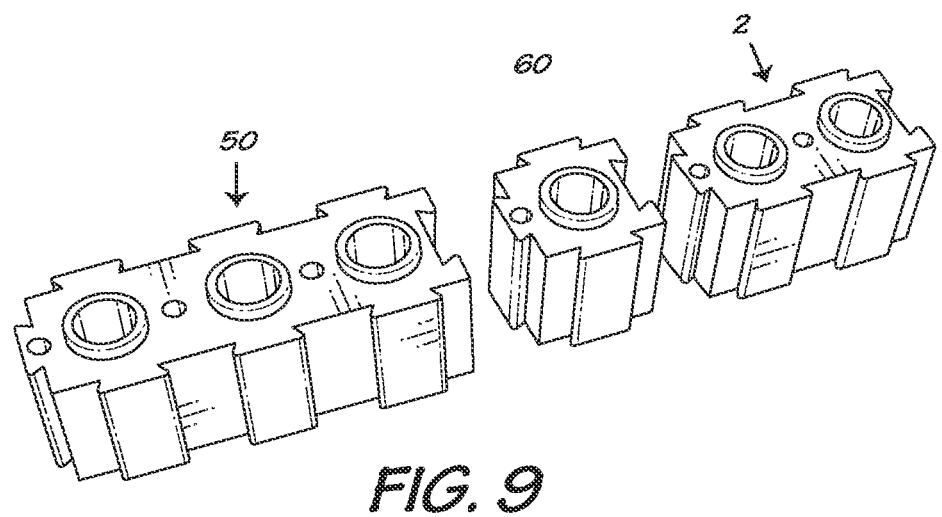
FIG. 9 is a perspective view of three building blocks according to embodiments of the present invention.

Referring to FIG. 9, the building blocks according to embodiments of the present invention can be shorter or longer than the building blocks described with reference to FIG. 2 to FIG. 4 and also illustrated as blocks 50, 60 and 2 in FIG. 9. For example, a shorter building block is illustrated as 60 in FIG. 9 and has only one dovetail protrusion on each side vertical face of the block, one tubular channel with a tubular protrusion and a tubular recess (not shown), and a one secondary channel smaller in diameter than the tubular channel. A longer building block is illustrated as 50 in FIG. 9 and has three dovetail protrusions on each side vertical face of the block, three tubular channel with a tubular protrusions and tubular recesses (not shown), and three secondary channels. The elements of the block 50 and block 60 parallel those of block 2 which is described above with reference to FIG. 2 to FIG. 4.

Figure 10:
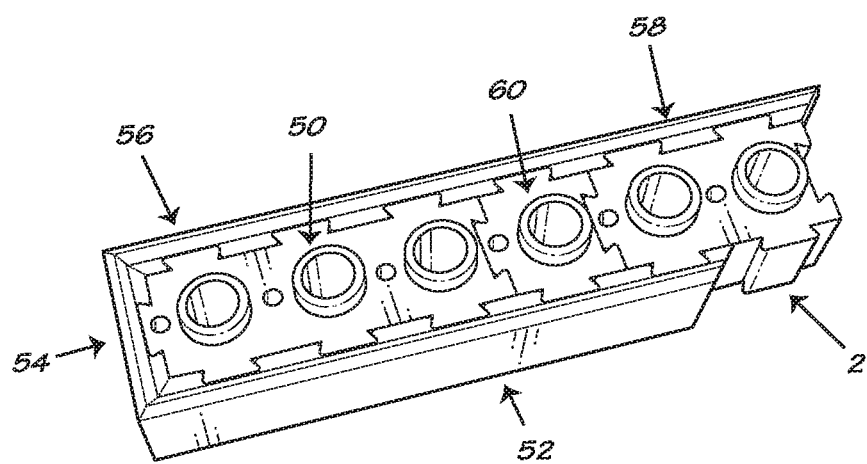
FIG. 10 is a top perspective view of the building blocks of FIG. 9 connected end to end and partially clad with side click panels according to embodiments of the present invention.
Figure 11:
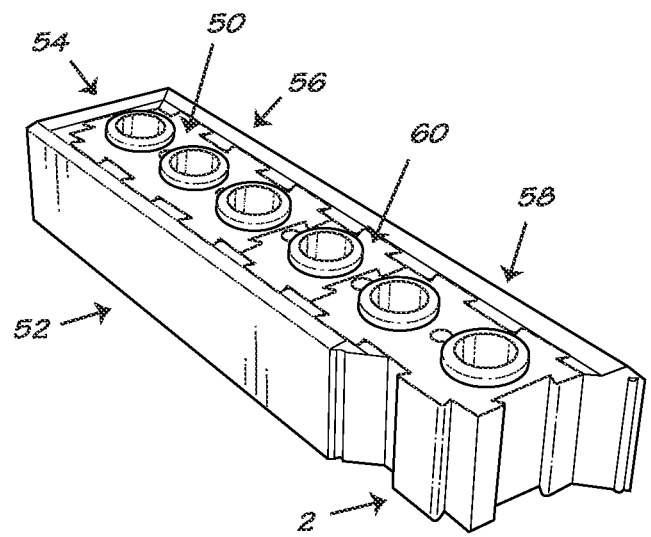
FIG. 11 is a front perspective view of the building blocks of FIG. 10.
Figure 12:
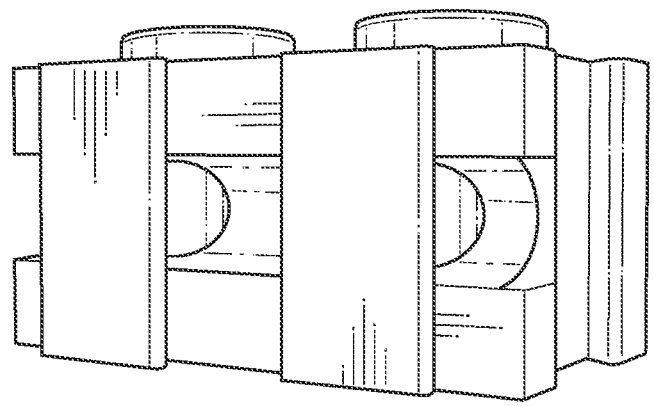
FIG. 12 is a side perspective view of a building block according to another embodiment of the present invention.
Figure 13:
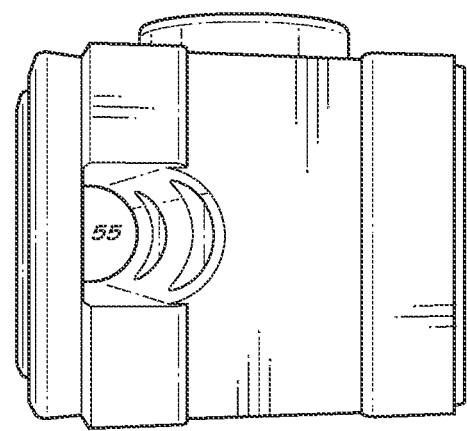
FIG. 13 is an end perspective view of the building block of FIG. 12.
Figure 14:
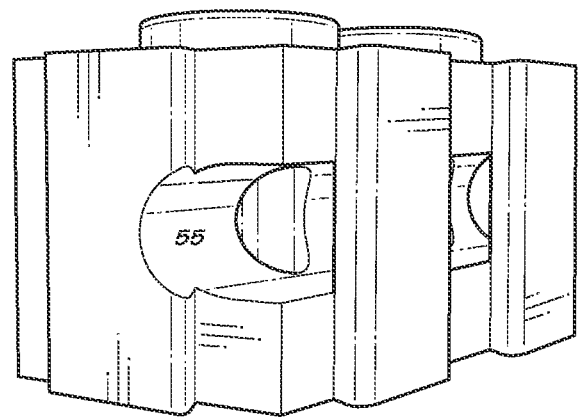
FIG. 14 is a side perspective view of the building block of FIG. 12 from the opposite end to that shown in FIG. 12.
Figure 15:
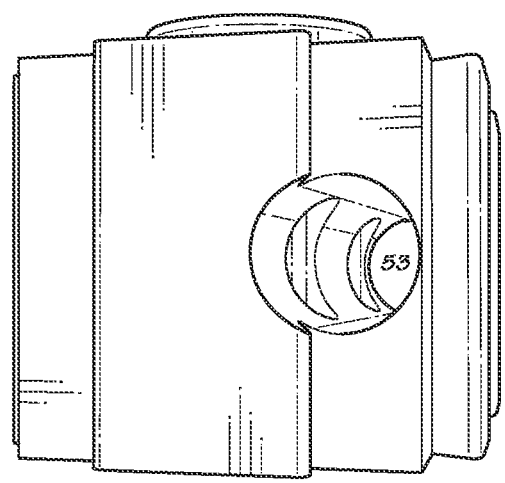
FIG. 15 is an end perspective view of the block of FIG. 12 from the opposite end to that shown in FIG. 13.

The building blocks 50, 60 and 2 may be joined end to end by the end dovetail protrusions in corresponding end dovetail recesses in adjacent building blocks as illustrated in FIG. 10 and FIG. 11. Side panels 52, 54, 56 and 58 of various lengths may be joined to the assembled blocks as illustrated in FIG. 10 and FIG. 11. The side panels include bevelled ends and tongue and grooves for connecting the panels one to the other and for forming a water resistant seal.

A building block according to another embodiment of the present invention is illustrated in FIG. 12 to FIG. 15. The building block has the same elements as the building block illustrated in FIG. 2 to FIG. 4 except that it also has a horizontal channel 55 which is open to the vertical tubular channels and is open on one vertical side.

Figure 16:
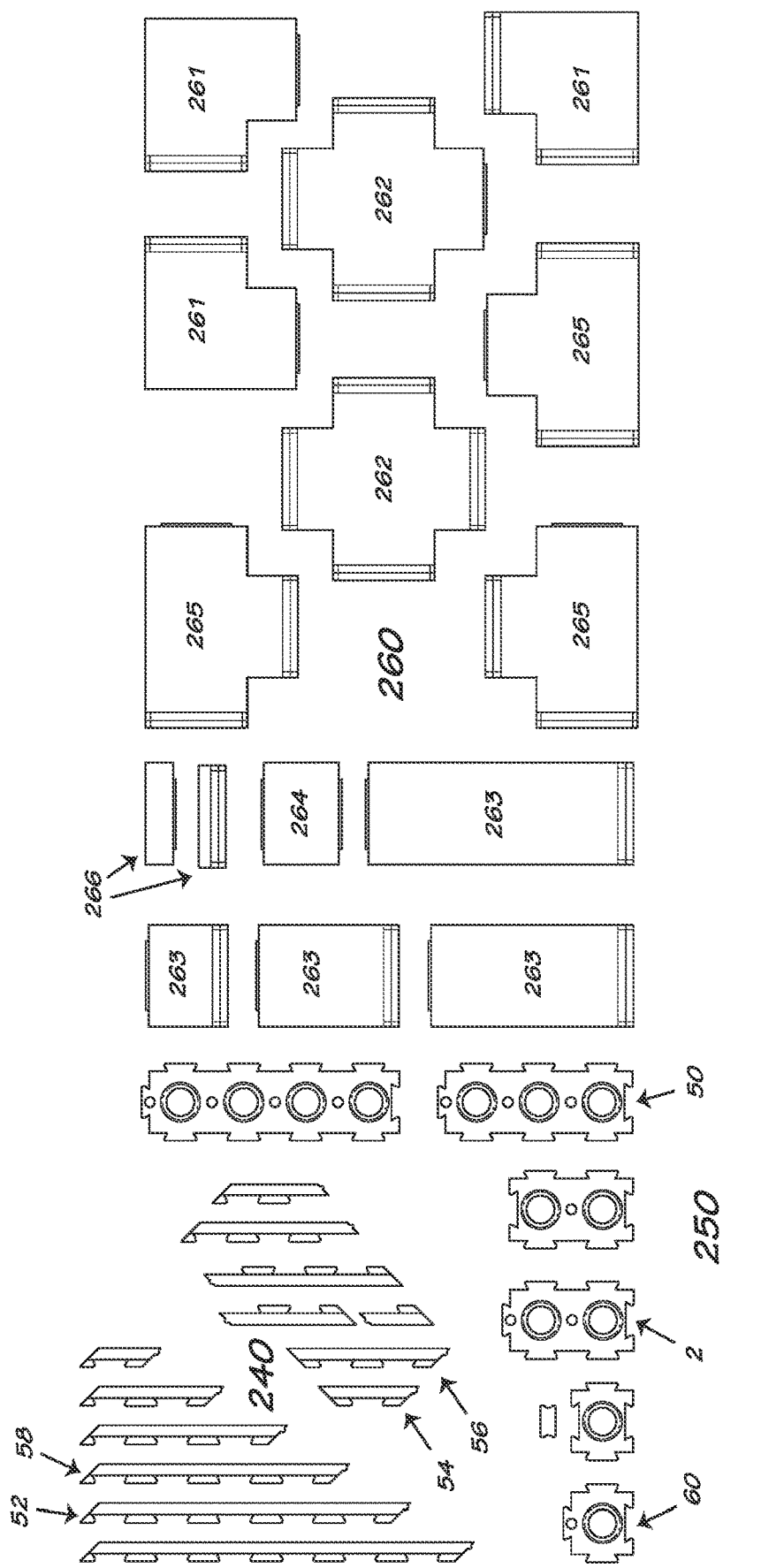
FIG. 16 is a view of an interlocking building system kit according to an embodiment of the present invention.

A building systems according to embodiments of the present invention can include a kit of building blocks, side panels and top caps, such as the kit of building components illustrated in FIG. 16. The kit of FIG. 16 includes side panels of various lengths (shown in edge view) as indicated generally at 240, building blocks of various lengths (shown from the top) as indicated generally at 250 and top caps of various shapes and lengths (shown from the top) as indicated generally at 260. The top caps 260 include corner caps 261, cross caps 262, rectangular caps 263, square caps 264, three-pointed caps 265

Figure 17:
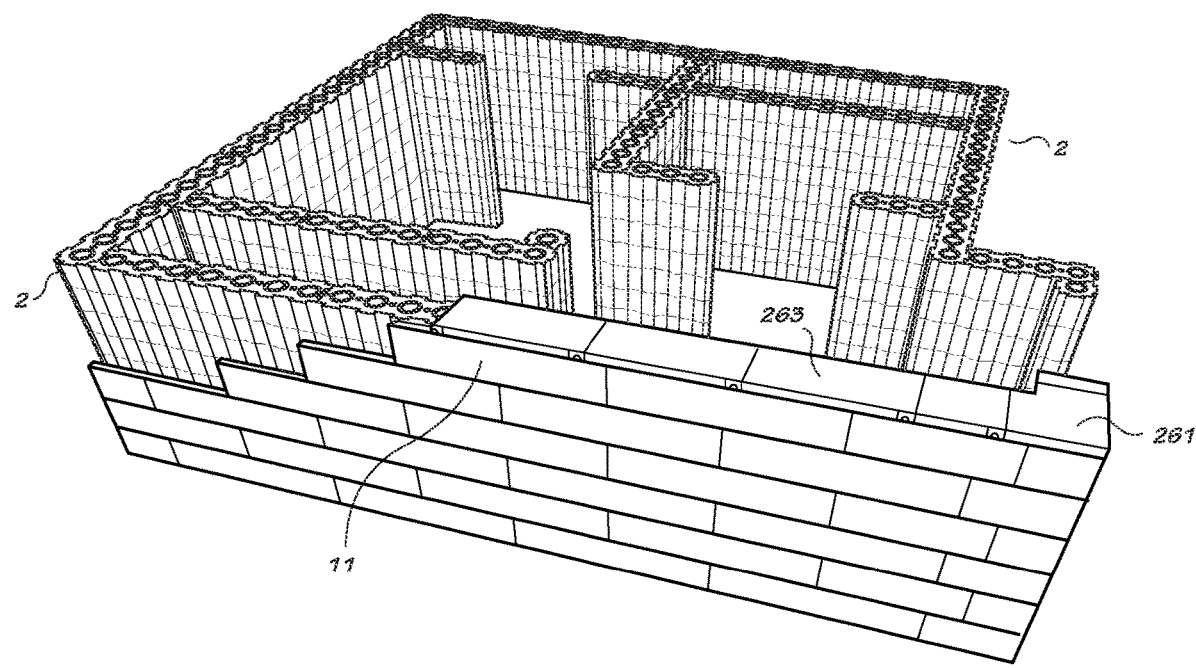
FIG. 17 is a top perspective view of walls of a partially completed structure made with a building block system according to embodiments of the present invention; and, FIG. 18 is a flow diagram of a method of manufacturing components of the present invention.

Building systems according to embodiments of the present invention do not require cutting, and adhesives are optional, depending on the application. Systems of the present invention can be assembled to form walls of a house or building as for example generally illustrated in FIG. 17. When placing the building blocks of the present invention to form a wall, the first course is suitably placed on a foundation, aligned in a straight line and interlocked end to end by placing the end dovetail protrusions in corresponding end dovetail recesses in adjacent building blocks. Thereafter, a second course of building blocks is mounted on the first course and may be staggered relative to the first course, or may not be staggered relative to the lower course as illustrated in FIG. 17. When mounted on the first course, the tubular recesses in the building blocks in the upper course are registered with the tubular protrusions of the building blocks on the lower course. Walls formed with the building blocks can be finished with side click panels and top caps according to embodiments of the present invention.

Figure 18:
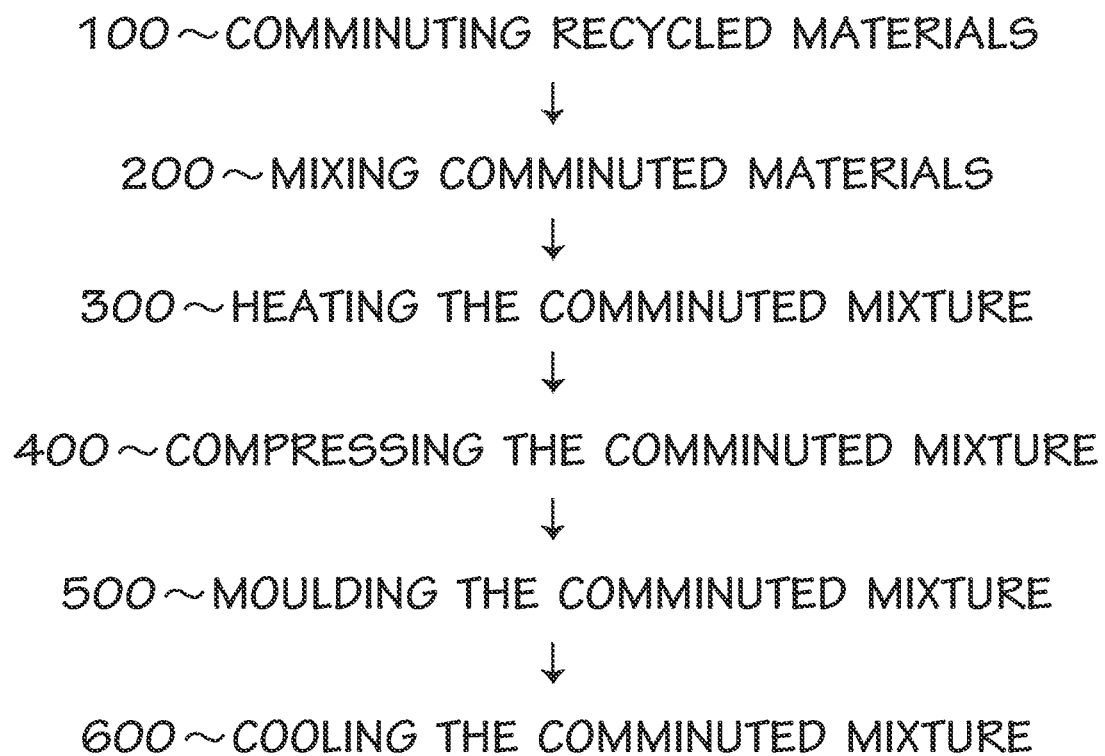

The present invention in another embodiment relates to a method of manufacture of the building components using a composite material. Referring to FIG. 18, in one embodiment, the method of forming the composite mixture material includes step 100 comminuting recycled materials including a recycled polymer material and a recycled aggregate, step 200 mixing the comminuted materials, step 300 heating the mixed materials to a temperature to melt the polymeric material to form a fused together composite material, step 400 applying a compressive stress load to the composite mixture prior to solidification, step 500 moulding the mixture and step 600 cooling the mixture. In one embodiment, the comminuted recycled materials are fed through a large format (2" diameter or greater) heated auger or heated screw which mixes, compresses and heats the mixture across a heat spectrum from about 200° C. to about 280° C. In one embodiment, the spacing between the auger blades decreases down the line such that the composite mixture can be progressively compressed. The resulting hot mixture is then put into a mould using one of several conventional methods such as injection moulding, extrusion moulding, or press moulding, as each component of the present system may require. The heated mixture is cooled naturally and/or artificially.

Systems of the present invention can also be adapted to be easily incorporated into autonomous construction.

Building components according the embodiments of the present invention can be made from a composite material including of a wide range of recycled thermal plastics, including but not limited to PE, PET, and PS which are ground to about ¼ inch particles and then blended with other ground up waste aggregates, including but not limited to, recycled concrete, brick, and/or glass. UV inhibitors and fire inhibitors as well as stabilizing agents can be added as they are needed (up to 10%). In embodiments of the present invention, the building blocks are solid other than for the conduits discussed above.

The present invention in another embodiment relates to a method of manufacture of the building components using a composite material. In one embodiment, the method of forming the composite mixture material includes comminuting recycled materials including a recycled polymer material and a recycled aggregate, mixing the comminuted materials, heating the mixed materials to a temperature to melt the polymeric material to form a fused together composite material, and applying a compressive stress load to the composite mixture prior to solidification. In one embodiment, the comminuted recycled materials are fed through a large format (2" diameter or greater) heated auger or heated screw which mixes, compresses and heats the mixture across a heat spectrum from about 200° C. to about 280° C. In one embodiment, the spacing between the auger blades decreases down the line such that the composite mixture can be progressively compressed. The resulting hot mixture is then put into a mould using one of several conventional methods such as injection moulding, extrusion moulding, or press moulding, as each component of the present system may require. The heated mixture is cooled naturally and/or artificially.

I claim:

1. A mortarless interlocking building block for constructing at least one of walls or partitions of a building comprising:
    a solid moulded body comprised of recycled materials having a front face, a rear face, opposed top and bottom faces and opposed end faces,
    the opposed front and rear faces being substantially identical and including at least two vertically extending dovetail protrusions defining a dovetail recess therebetween for matingly receiving a dovetail protrusion of another building component,
    one of the opposed end faces having at least one vertically extending dovetail recess and the other of the end faces having at least one vertically extending dovetail protrusion for mating with a dovetail recess of another building block to interconnect adjacent blocks in end-to-end relation, and
    the top face having at least two tubular protrusions and the bottom face having at least two tubular recesses to lock stacked building blocks,
    where each of the dovetail protrusions being substantially identical having a same dimension and all of the dovetail recesses are sized to receive a respective said dovetail protrusion.

2. The block of claim 1, further including at least one channel for receiving wiring, piping or reinforcement.

3. The block of claim 2, wherein the dovetail protrusions further comprise flat front faces and rounded corners.

4. The block of claim 3, wherein the tubular protrusions are open at top and edges of the tubular protrusions are rounded.

5. The block of claim 4, wherein edges of the tubular recesses are chamfered.

6. The block of claim 5, wherein the recycled materials comprise a mixture of recycled plastic and recycled aggregate.

7. A building system comprising:
    a plurality of mortarless interlocking building blocks for constructing at least one of walls or partitions of a building, each block comprising:
        a solid moulded body comprised of recycled materials having a front face, a rear face, opposed top and bottom faces and opposed end faces,
        the opposed front and rear faces being substantially identical and including at least two vertically extending dovetail protrusions defining a dovetail recess therebetween for matingly receiving a dovetail protrusion of another building component,
        one of the opposed end faces having at least one vertically extending dovetail recess and the other of the end faces having at least one vertically extending dovetail protrusion for mating with a dovetail recess of another building block to interconnect adjacent blocks in end-to-end relation, and
        the top face having at least two tubular protrusions and the bottom face having at least two tubular recesses to lock stacked building blocks,
        where each of the dovetail protrusions being substantially identical having a same dimension and all of the dovetail recesses are sized to receive a respective said dovetail protrusion,
    and further comprising:
        at least one mortarless side panel including a finished outside surface and at least one dovetail protrusion on an opposing surface for joining the side panel to at least one of the blocks, and a connector on each end of the panel for joining the side panel to other side panels, and
        at least one top cap including a finished top surface.

8. The building system of claim 7, wherein the mortarless side panel further comprises a protrusion at one end and a notch at the other end for forming a pressure fit seal when two side panels are locked together, wherein the pressure seal inhibits water penetration.

9. The building system of claim 7, further including at least one channel for receiving wiring, piping or reinforcement.

10. The building system of claim 9, wherein the dovetail protrusions further comprise flat front faces and rounded corners.

11. The building system of claim 10, wherein the tubular protrusions are open at top and edges of the tubular protrusions are rounded.

12. The building system of claim 11, wherein edges of the tubular recesses are chamfered.

13. The building system of claim 12, wherein the recycled materials comprise a mixture of recycled plastic and recycled aggregate.

\* \* \* \* \*